United States Patent [19]

Schilling

[11] Patent Number: 5,224,120
[45] Date of Patent: Jun. 29, 1993

[54] DYNAMIC CAPACITY ALLOCATION CDMA SPREAD SPECTRUM COMMUNICATIONS

[75] Inventor: Donald L. Schilling, Sands Point, N.Y.

[73] Assignee: InterDigital Technology Corporation, Wilmington, Del.

[21] Appl. No.: 891,135

[22] Filed: Jun. 1, 1992

Related U.S. Application Data

[63] Continuation-in-part of Ser. No. 622,235, Dec. 5, 1990.

[51] Int. Cl.[5] .............................................. H04K 1/00
[52] U.S. Cl. ........................................................ 375/1
[58] Field of Search ................................ 375/1; 380/34

[56] References Cited

U.S. PATENT DOCUMENTS

| | | | |
|---|---|---|---|
| 3,838,342 | 9/1974 | Bjorkman | 325/32 |
| 4,222,115 | 9/1980 | Cooper et al. | 375/1 |
| 4,285,060 | 8/1981 | Cobb et al. | 375/1 |
| 4,538,280 | 8/1985 | Mosley, Jr. et al. | 375/1 |
| 4,860,307 | 8/1989 | Nakayama | 375/1 |
| 4,901,307 | 2/1990 | Gilhousen et al. | 375/1 |
| 4,958,359 | 9/1990 | Kato | 375/1 |
| 5,016,256 | 5/1991 | Stewart | 375/1 |
| 5,056,109 | 10/1991 | Gilhousen et al. | 375/1 |
| 5,073,900 | 12/1991 | Mallinckrodt | 375/1 |
| 5,093,840 | 3/1992 | Schilling | 375/1 |
| 5,109,390 | 4/1992 | Gilhousen et al. | 375/1 |
| 5,161,789 | 11/1992 | Schilling | 375/1 |
| 5,166,951 | 11/1992 | Schilling | 375/1 |

Primary Examiner—Salvatore Cangialosi
Attorney, Agent, or Firm—David Newman & Associates

[57] ABSTRACT

A dynamic capacity allocation spread spectrum CDMA communications system for overlaying, at least in part, geographically and in frequency a radio-relay system. A first receiver, located near the relay receiver of the radio-relay system, measures a first power level within the relay bandwidth of the radio-relay system. A second receiver, located near the relay receiver, measures a second power level outside the relay bandwidth of the radio-relay system. The first power level is compared to a predetermined threshold. A ratio signal is generated from the first power level and the second power level. When the first power level exceeds the predetermined threshold, the ratio signal is used to regulate the power level and dynamically allocate the capacity transmitted from each spread-spectrum-base station.

30 Claims, 12 Drawing Sheets

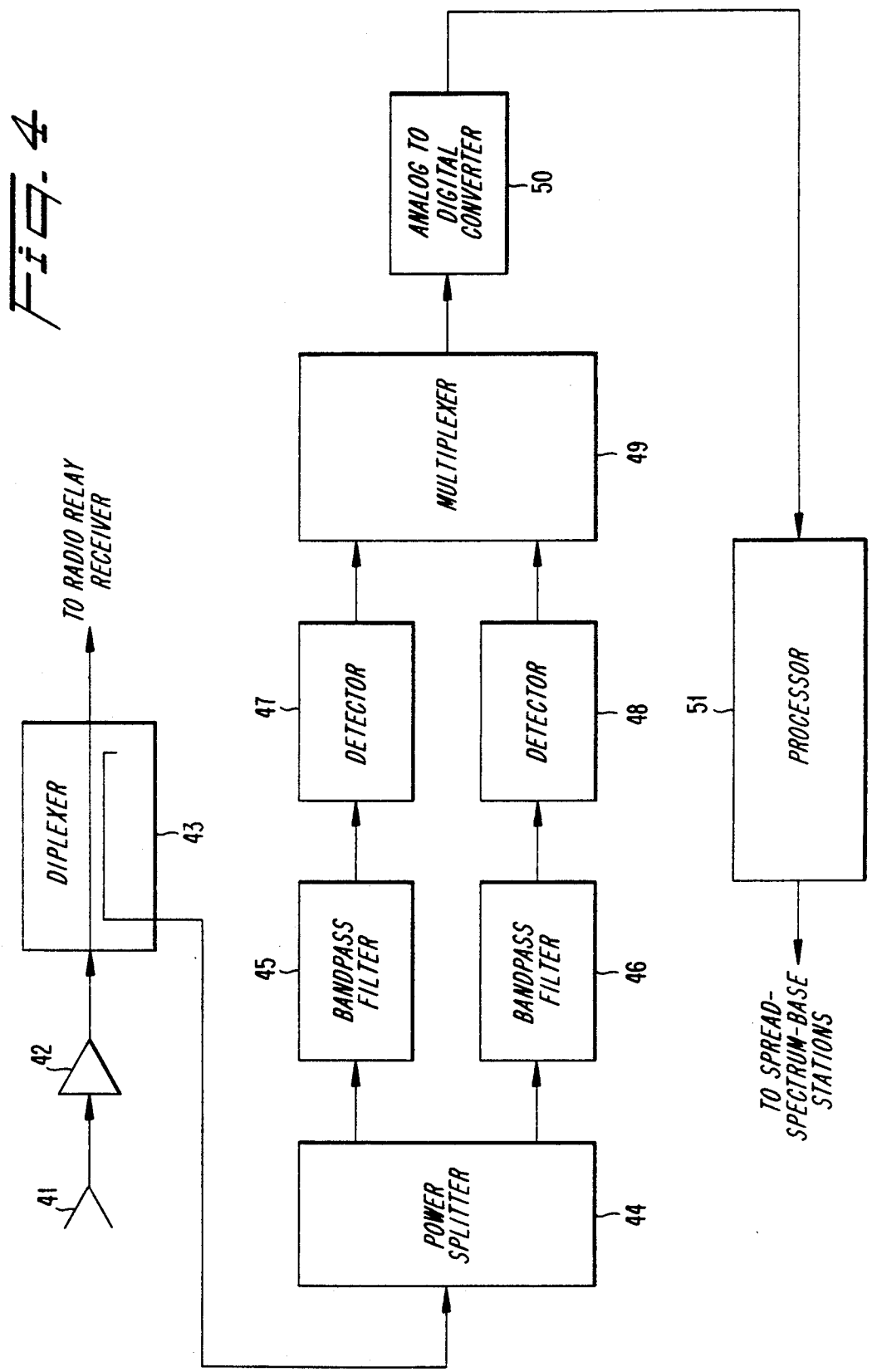

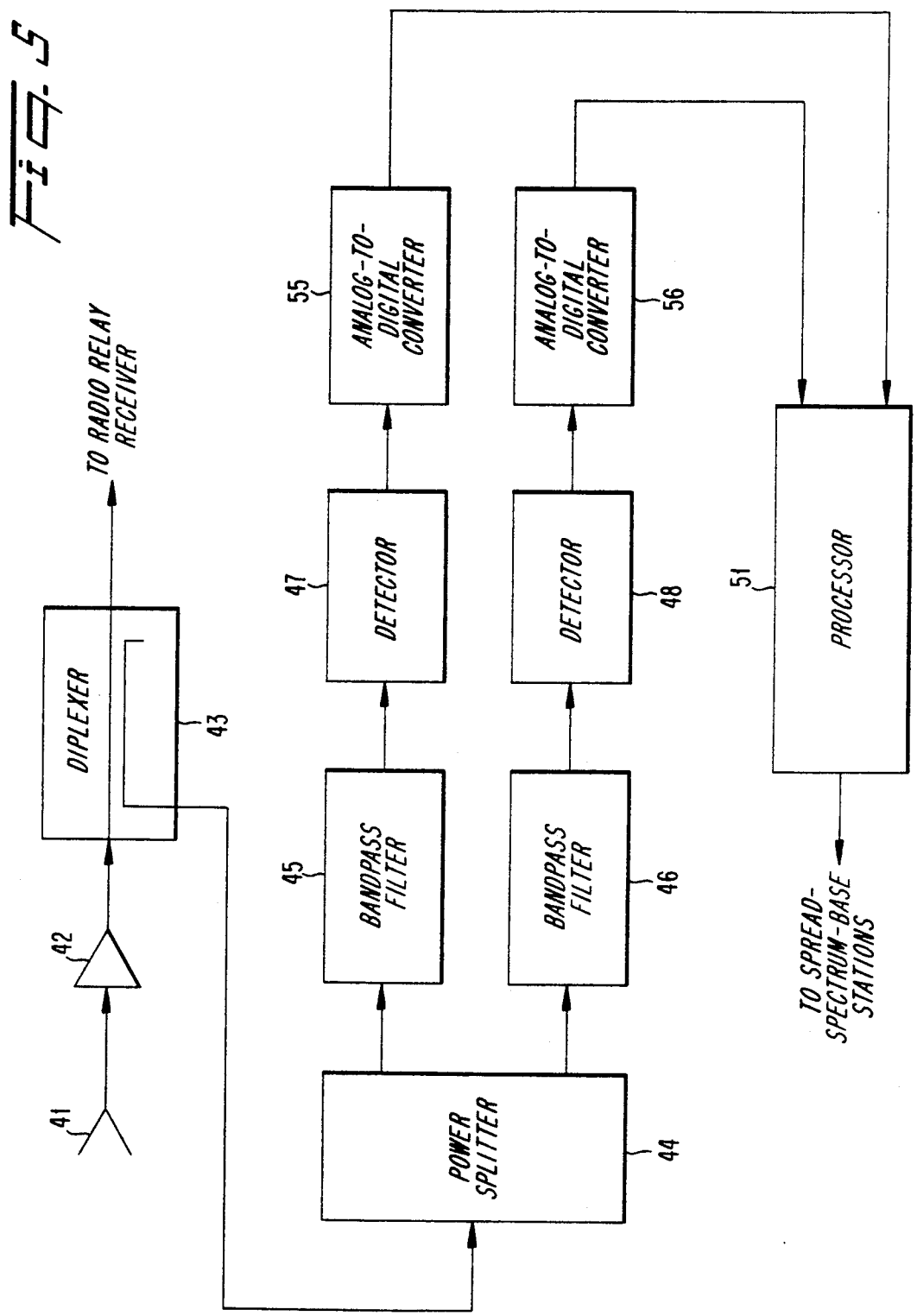

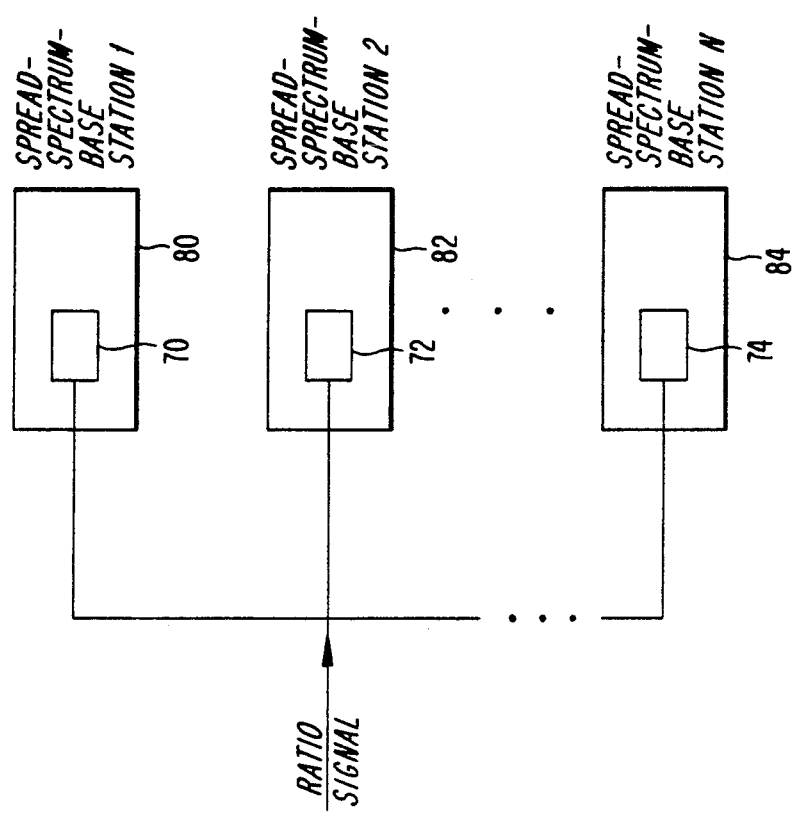
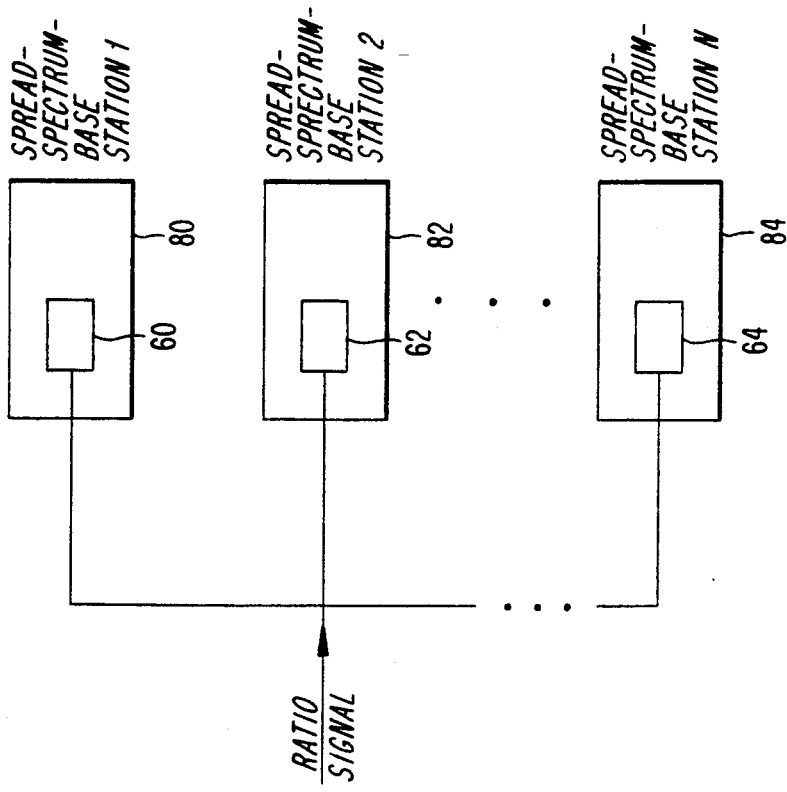

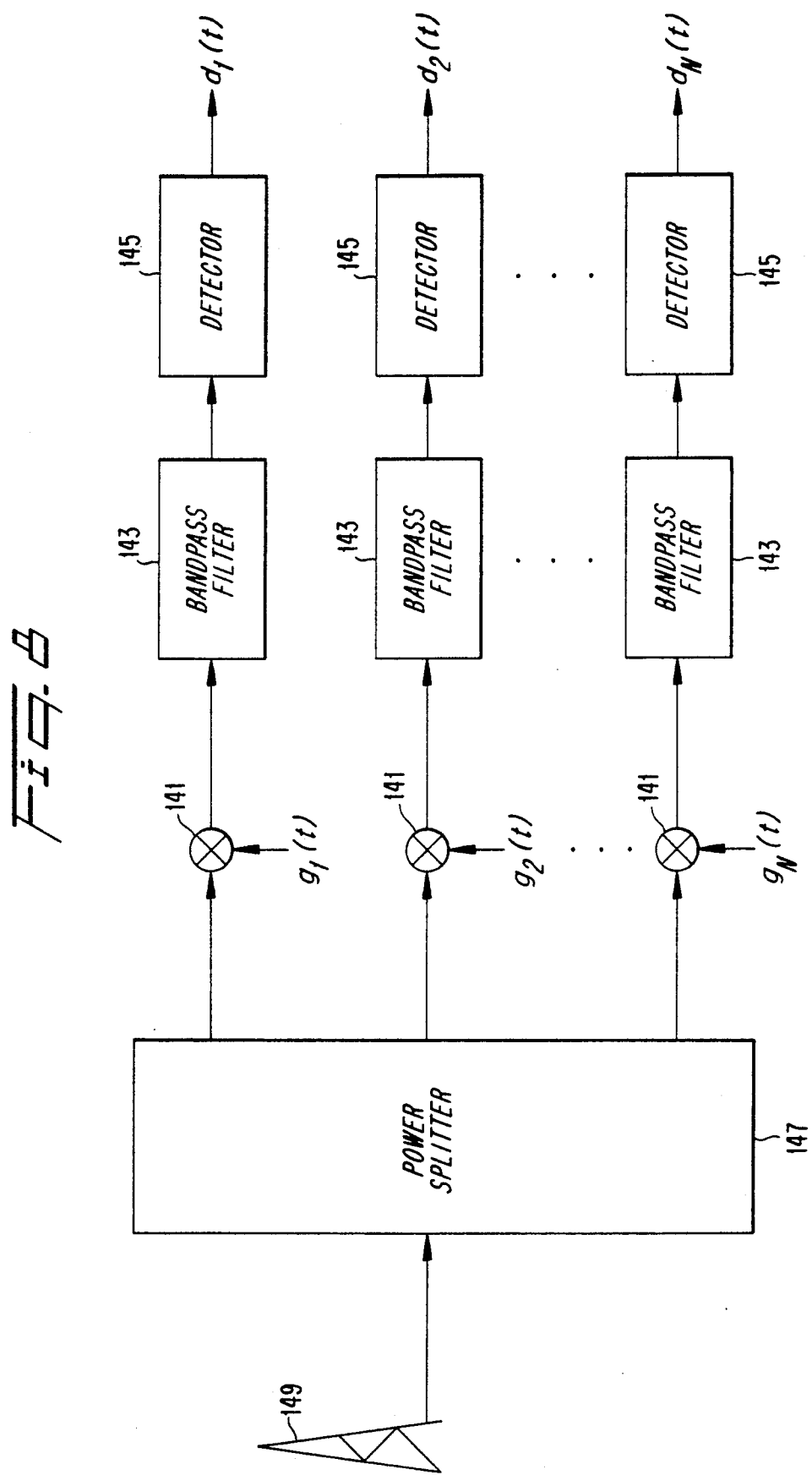

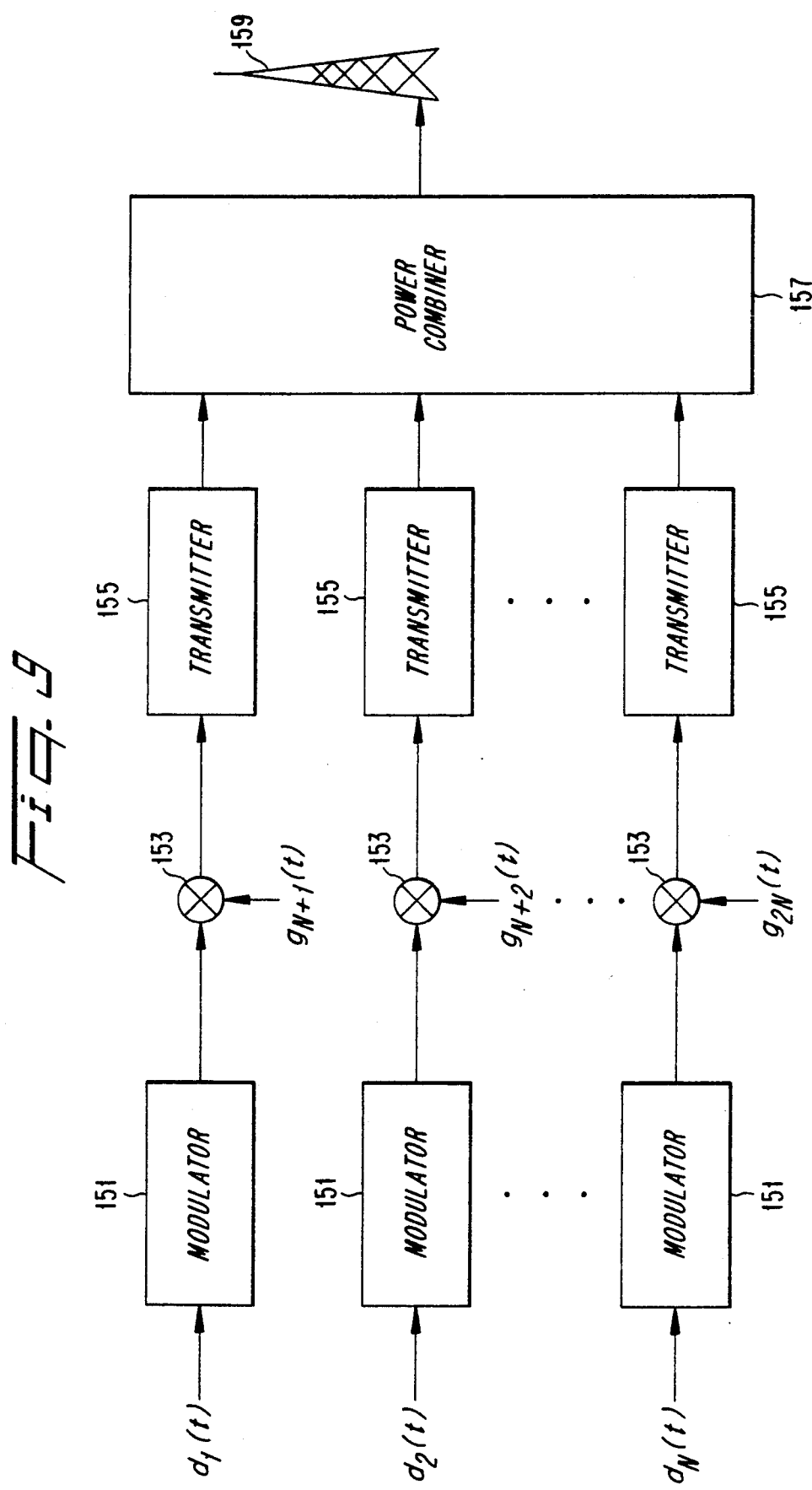

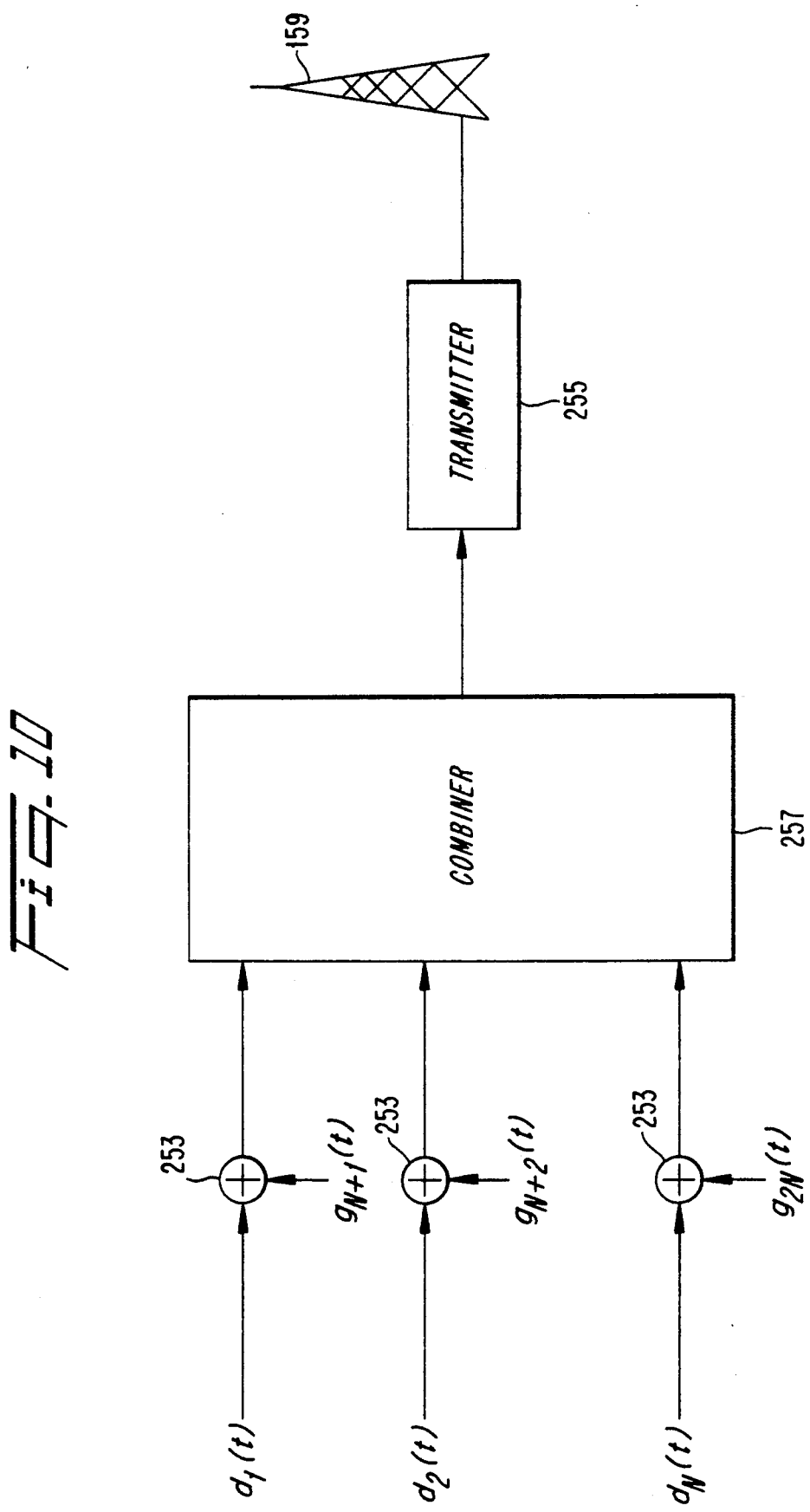

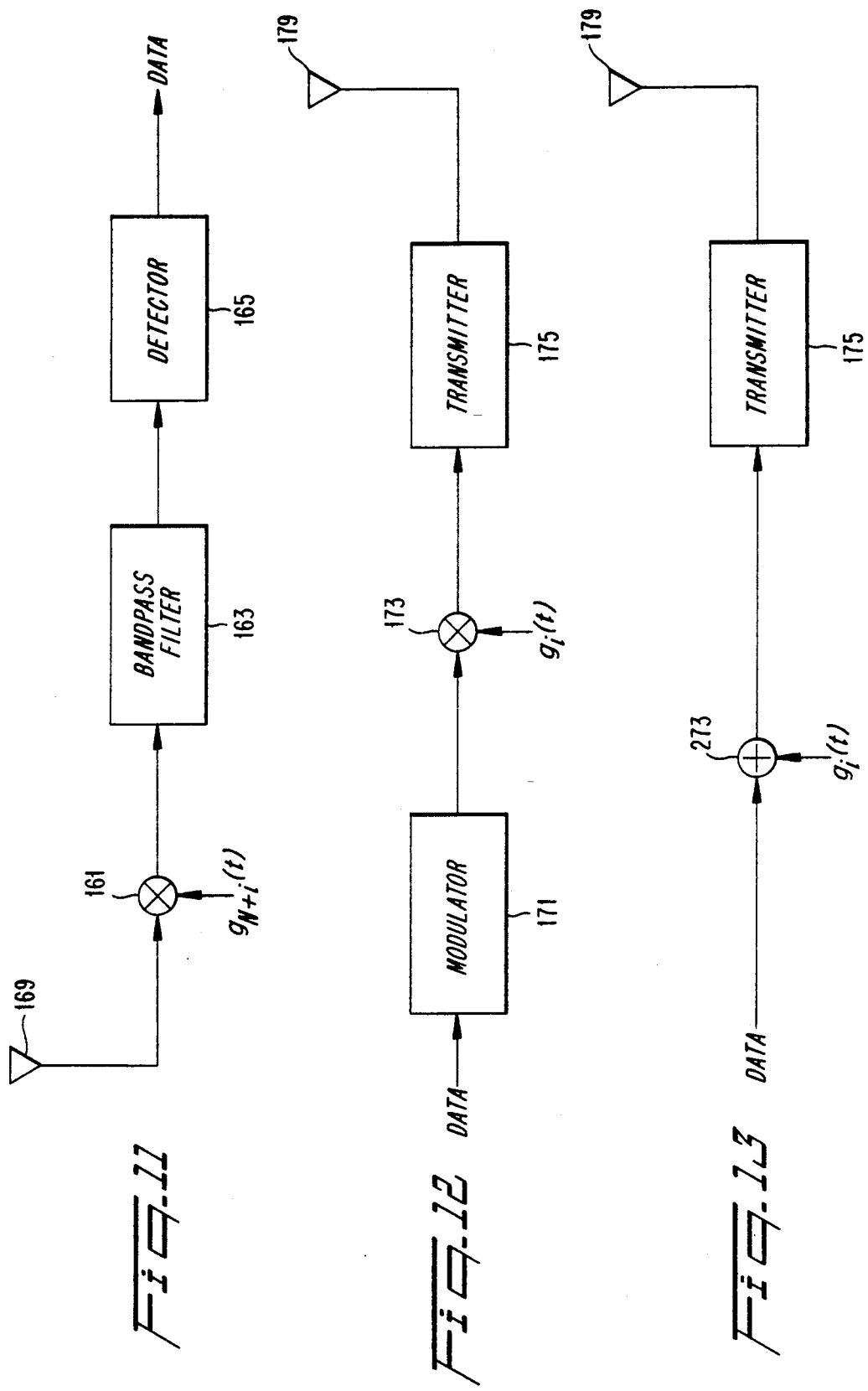

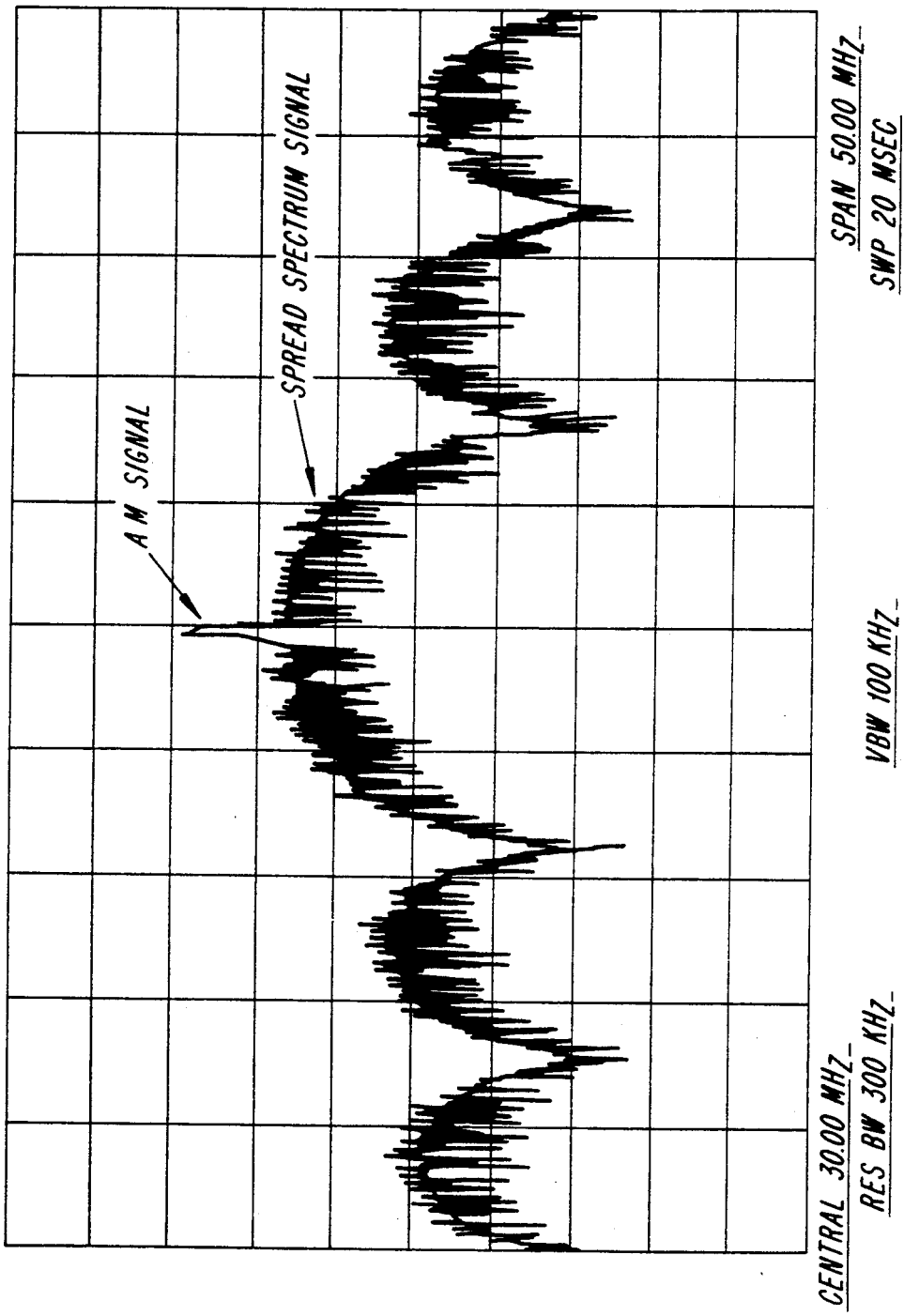

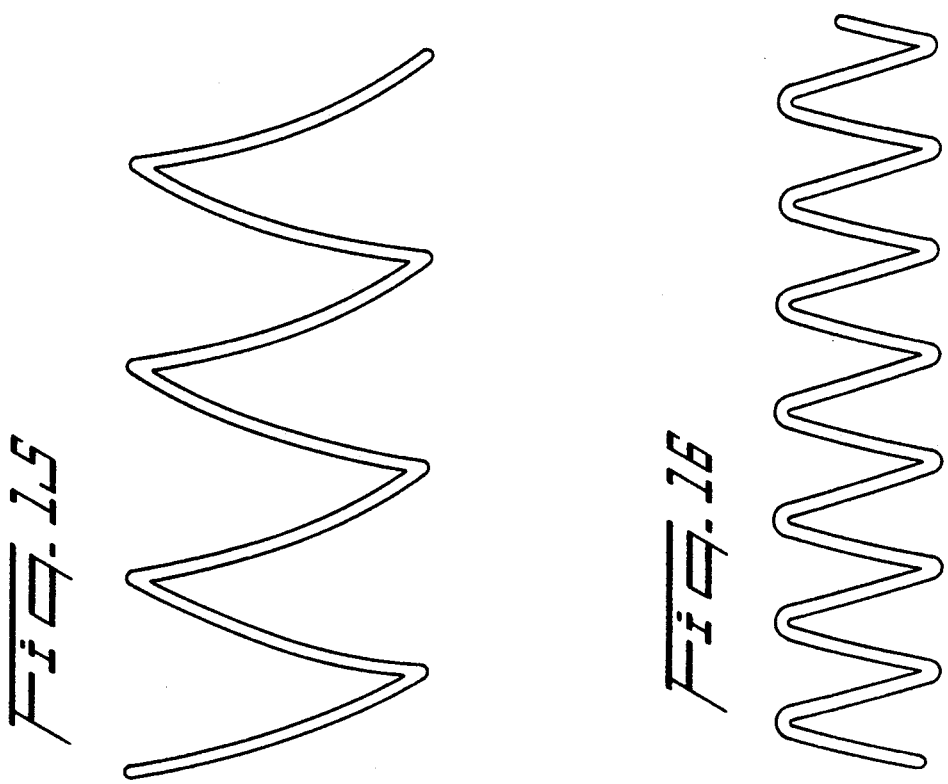

DYNAMIC CAPACITY ALLOCATION CDMA SPREAD SPECTRUM COMMUNICATIONS

RELATED PATENTS

This is a continuation-in-part patent application of the U.S. patent application having Ser. No. 07/622,235, filing date Dec. 5, 1990, entitled OVERLAYING SPREAD SPECTRUM CDMA PERSONAL COMMUNICATIONS SYSTEM by Donald L. Schilling,; of the U.S. patent application having Ser. No. 07/700,788, filing date May 15, 1991, entitled SPREAD SPECTRUM MICROWAVE OVERLAY WITH NOTCH FILTER by Donald L. Schilling,; of the U.S. patent application having Ser. No. 07/700,789, filing date May 15, 1991, entitled SPREAD SPECTRUM CDMA COMMUNICATIONS SYSTEM MICROWAVE OVERLAY by Donald L. Schilling,; and of the U.S. patent application having Ser. No. 07/626,109, filing date Dec. 14, 1990, entitled SYNCHRONOUS SPREAD-SPECTRUM COMMUNICATIONS SYSTEM AND METHOD by Donald L. Schilling.

BACKGROUND OF THE INVENTION

This invention relates to spread spectrum communications, and more particularly to dynamically allocating power and capacity of spread spectrum communications so as to prevent interference to a radio-relay system, such as a microwave relay system, or to a cellular communications system, such as the system conforming to the AMPS or IS54 standards. This disclosure refers to either system as a radio relay system.

DESCRIPTION OF THE RELEVANT ART

Radio-relay systems, such as the fixed service, microwave systems or cellular telephone systems, employing digital transmission systems and/or analog transmission systems, have requirements for interference. In digital transmission systems, some aspects of system interference require a slightly different treatment than traditionally applied to analog systems. In particular, the effect of interference on a victim digital receiver is primarily one of threshold degradation. Threshold degradation of a digital receiver is defined, for the purpose of interference calculations, as the received carrier level that produces a bit error rate (BER) of $10^{-6}$. Threshold degradation for analog systems typically is defined in terms of received signal-to-noise ratio.

Digital systems have the following characteristics:
 a) Digital receiver thresholds vary because of differences in bit rate, modulation technique and noise figure.
 b) "Normal" received carrier level has little meaning in digital systems because the received carrier level is determined by the fade margin requirements of each hop.
 c) Noise degradation criteria are inappropriate because noise and interference lead to bit errors which generally do not result in random noise in voice channels. One might hear an infrequent "click" at the $10^{-6}$ BER.

A parameter, called the threshold-to-interference (T/I) ratio, is defined for digital systems. Threshold-to-interference ratio is defined as the ratio of desired signal to undesired signal that degrades performance from $10^{-6}$ to $10^{-5}$ BER.

The advantage of the T/I ratio is that the difference in thresholds due to bit rate, modulation technique, and noise figure are all taken into account and the absolute level of allowable interference can be easily determined by subtracting the T/I ratio from the threshold of a particular receiver.

Measurement of the T/I ratio for a digital system is accomplished by fading the receiver to the point where a $10^{-6}$ BER is present on the system. Interference is then injected until a BER of $10^{-5}$ is present on the system. The ratio of the relative level of the desired received signal and the interference is then measured and this ratio of relative levels is the T/I ratio.

Sample plots of the required T/I ratio for a typical receiver are shown in FIGS. 1 and 2. FIG. 1 shows the T/I ratio for digital interference and FIG. 2 shows the T/I ratio for FM interference for cochannel and adjacent channel cases. The receiver threshold and T/I ratio for a particular type of digital equipment would normally be supplied by the equipment manufacturer. The T/I ratios referred to in these figures are for a single exposure. Multiple exposures can be calculated through relative power addition. T/I can be converted to the more familiar carrier-to-interference (C/I) ratio if the T/I ratio and fade margin are known:

$$C/I = T/I + Fade\ Margin\ (dB).$$

For an analog microwave system, the T/I ratio is determined by "fading" the receiver until the output signal-to-noise ratio (SNR) is 30 dB. Interference is then injected until a SNR of 29 dB is present on the system. In either the digital or the analog case, the T/I ratio occurs when the interference is approximately 6 dB below the internal noise level of the receiver.

OBJECTS OF THE INVENTION

A general object of the invention is to allow spread spectrum communications to use the same frequencies and to overlay the same geographical region as a radio-relay system.

Another object of the invention is a system for spread spectrum communications which can be used concurrently with a radio-relay system without interfering with the radio-relay system.

An additional object of the invention is a system for spread spectrum communications which approaches the maximum capacity possible, without interfering with the radio-relay system.

A further object of the invention is a system for spread spectrum communications which allocates overall power level and capacity in response to a dynamically changing communications environment.

SUMMARY OF THE INVENTION

The present invention provides a system and method for dynamically allocating capacity and power of spread spectrum communications overlaying, geographically and in frequency, a radio-relay system. The capacity and power of each cell for spread spectrum communications are allocated so as to prevent interference to the radio-relay system. The radio-relay system has at least one relay station within the geographical area, and the radio-relay system transmits at least one signal with a radio-relay bandwidth. Each relay station has at least one radio-relay transmitter and at least one radio-relay receiver. The radio-relay bandwidth is defined herein as the transmission bandwidth of the signal of the radio-relay system.

The dynamic capacity allocation is performed with a monitoring system placed at a representative sample of, or all, radio-relay receiver sites. The monitoring system is connected, preferably using a dedicated telephone line, to an appropriate spread-spectrum-base station(s). If the monitoring system detects an excess of interference, then the monitoring station immediately notifies the spread-spectrum-base station. In response to this notification, the spread-spectrum-base station does not accept and/or reduces the number of spread-spectrum users allowed to access the spread-spectrum-base station(s). Alternately, the monitoring station can continuously, or at regular intervals e.g. one millisecond, notify the base station(s) regarding the radio-relay receiver's status, and thereby employ prediction techniques to estimate the future status of the radio-relay receiver. In this manner, the capacity of the spread-spectrum-base station(s) is dynamically controlled by the tolerable signal-to-noise ratio or bit error rate of the radio-relay system. By using these techniques, users of the radio-relay system do not experience interference independent of the received, faded signal level of the radio-relay system. Also, users of the spread spectrum communications system are not envisaged as being cut off, since the predictive techniques permit a smooth load shedding.

Accordingly, the present invention, as embodied and broadly described herein, provides a system as well as a method for measuring, using a first radio receiver, a first power level within the radio-relay bandwidth of the radio-relay system. The receiver of the radio-relay system is defined herein as the relay receiver. The first receiver is located near the relay receiver of the radio-relay system, and has a first bandpass filter, respectively, with the first bandpass filter having a first bandwidth, which, by way of example, may be 100 kHz, 1 MHz, or 10 MHz.

The system and method also measure, using a second receiver, a second power level outside the radio-relay bandwidth of the radio-relay system. The second receiver is located near the relay receiver of the radio-relay system, and has a bandpass filter with a second bandwidth, which, by way of example, may be 100 kHz, 1 MHz, or 10 MHz.

The first power level is compared to a predetermined threshold, and, in addition, a ratio signal is generated from the first power level and the second power level. The ratio signal typically represents a ratio of the first power level to the second power level, and indicates the received input C/I ratio. Using the ratio signal and the first power level, a power level transmitted from each spread-spectrum-base station located within the geographical region is regulated and the capacity of the spread spectrum communications is dynamically allocated.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 4 is a block diagram of the dynamic capacity allocated spread spectrum communications;

FIG. 5 is a block diagram of an alternate embodiment of the dynamic capacity allocated spread spectrum communications;

FIG. 6 is a block diagram of a first embodiment of spread-spectrum-base station transmitters;

FIG. 7 is a block diagram of a second embodiment of spread-spectrum-base station transmitters;

FIG. 8 is a block diagram of a spread spectrum processor for a spread-spectrum-unit receiver;

FIG. 9 is a block diagram of a first embodiment of a spread-spectrum-unit transmitter;

FIG. 10 is a block diagram of a second embodiment of a spread-spectrum-unit transmitter;

FIG. 11 is a block diagram of a spread-spectrum-unit receiver;

FIG. 12 is a first embodiment of a spread-spectrum-unit transmitter;

FIG. 13 is a second embodiment of a spread-spectrum-unit transmitter;

FIG. 14 shows the spectrum of a spread spectrum signal with an AM signal of equal power at its carrier frequency;

FIG. 15 shows a spread spectrum data signal when the spread spectrum signal power is equal to an AM signal power;

FIG. 16 shows an audio signal when the spread spectrum signal power is equal to the AM signal power;

FIG. 18 shows possible position settings of switches of FIG. 17 to form PN sequences.

DETAILED DESCRIPTION OF THE PREFERRED EMBODIMENTS

Figure 2:
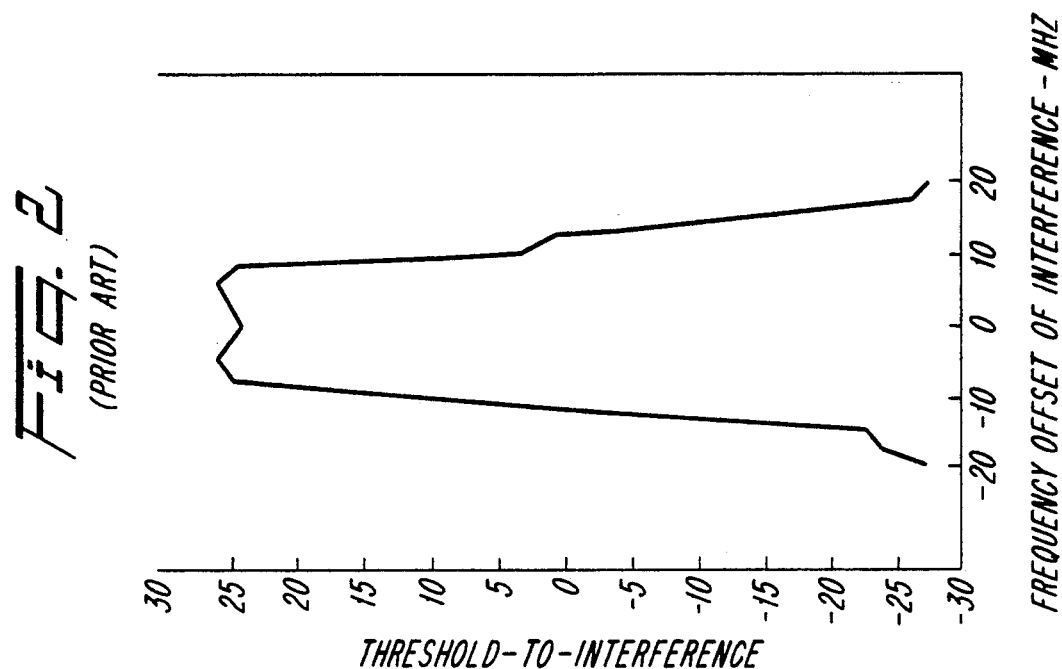
FIG. 2 shows a typical threshold-to-interference characteristic for analog FM interference.
Figure 1:
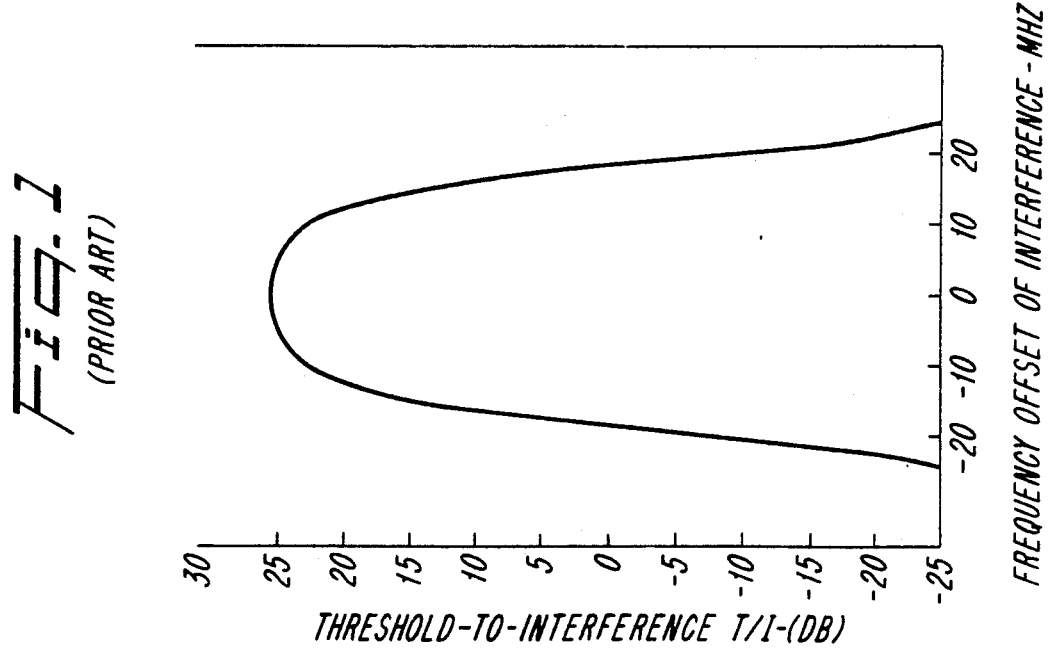
FIG. 1 shows a typical threshold-to-interference characteristic for digital interference.

Reference is now made in detail to the present preferred embodiments of the invention, examples of which are illustrated in the accompanying drawings, wherein like reference numerals indicate like elements throughout the several views.

Figure 3:
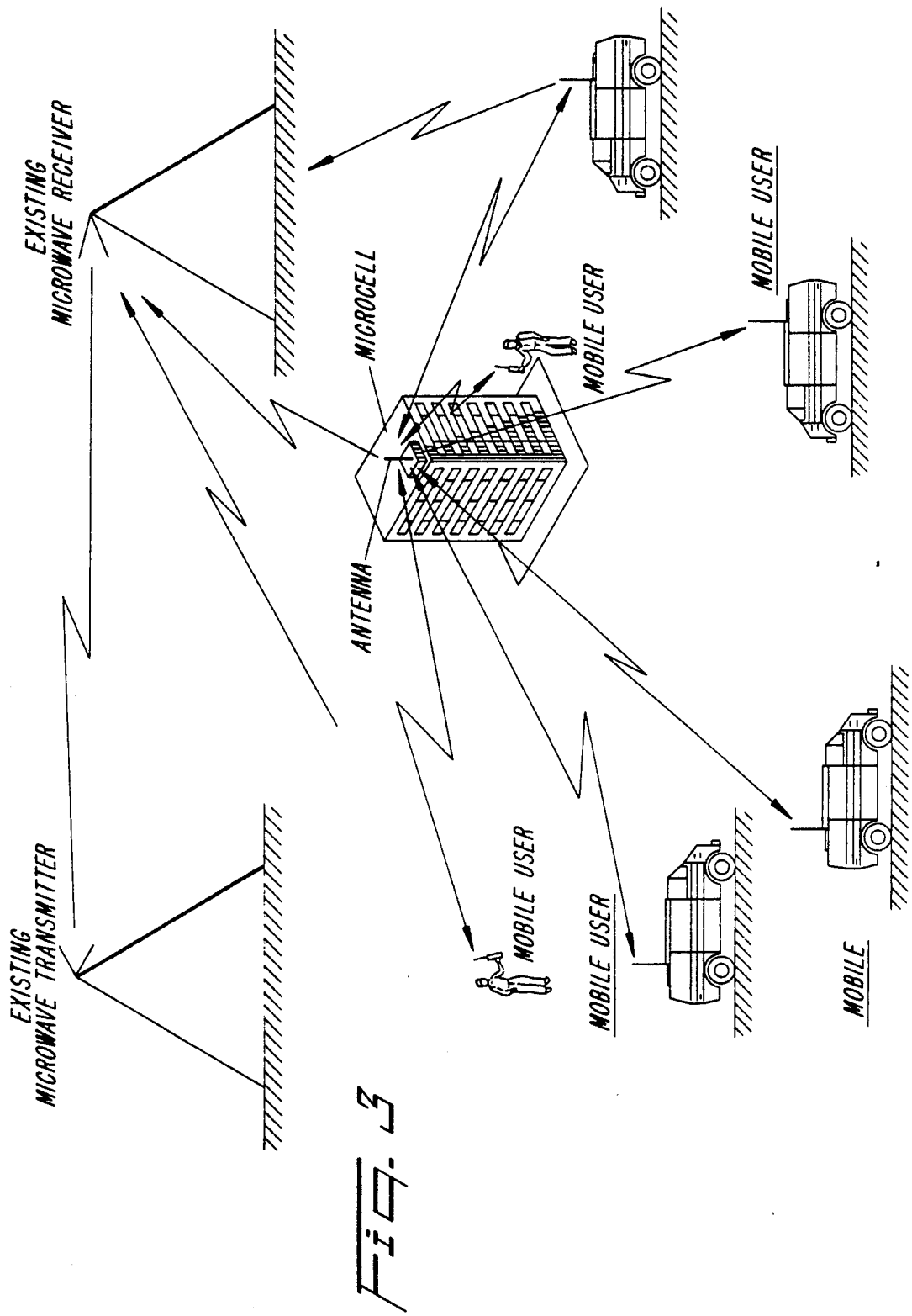
FIG. 3 illustrates a system for spread spectrum communications overlaying geographically a radio-relay system.

As illustratively shown in FIG. 3, a spread spectrum geographic architecture is shown, with a multiplicity of microcells each having a spread-spectrum-base station for communicating with a plurality of spread-spectrum users. The spread spectrum communications of the present invention is located within a same geographical region as occupied by at least one radio-relay system, such as a fixed service, microwave system or cellular communications system. Each radio-relay system communicates over a channel, defined herein as a radio-relay channel, which has a radio-relay bandwidth. In presently deployed fixed service microwave systems, the radio-relay bandwidth is 10 MHz or less.

The radio-relay system may be a fixed-service, microwave system, a cellular telephone system, or any other system having pre-assigned channels of radio spectrum. The radio-relay system may employ analog modulation techniques such as amplitude modulation (AM), frequency modulation (FM), or digital modulation techniques such as amplitude-shift-keying (ASK), frequency-shift-keying (FSK), or phase-shift-keying (PSK) modulation. Time division multiple access (TDMA) or frequency division multiple access (FDMA) may also be employed.

In the 1.85–1.99 GHz region, the spectrum is used by a plurality of narrowband users, i.e. narrow in bandwidth relative to the spread spectrum bandwidth, with each microwave user using one of a plurality of radio-relay-microwave channels. A first radio-relay microwave system using a first radio-relay microwave channel is separated in frequency by a guard band from a second radio-relay microwave channel. The first radio-relay microwave system usually is also separated geographically or spatially from the second radio-relay microwave system.

The spread spectrum communications may use code division multiple access (CDMA) with direct sequence (DS) spread spectrum modulation, and includes at least one spread-spectrum-base station and at least one spread-spectrum unit located within the same geographical region as occupied by the radio-relay system such as the fixed service microwave system. The spread spectrum communications also could employ either frequency hopping spread spectrum, narrowband CDMA, or broadband CDMA. The spread spectrum CDMA communications system can be used for communicating data between a plurality of spread-spectrum users. The data may be, but are not limited to, computer data, facsimile data or digitized voice.

A spread-spectrum-base station, which typically is not collocated geographically with a fixed service microwave station, communicates data between a plurality of spread-spectrum users. A first spread-spectrum user uses a first spread-spectrum unit, and a second spread-spectrum user uses a second spread-spectrum unit, etc.

In the exemplary arrangement, illustrated in FIG. 4, the spread spectrum communications of the present invention for dynamically allocating power and capacity of the spread spectrum communications includes first measuring means, second measuring means, comparing means, generating means, regulating means, and informing means. The first measuring means measures a first power level within the radio-relay bandwidth of the radio-relay system. The second measuring means measures a second power level outside the radio-relay bandwidth of the radio-relay system, the comparing means compares the first power level to a predetermined threshold. The generating means generates a ratio signal from the first power level and the second power level. The regulating means regulates a power level transmitted from at least one spread-spectrum-base station in response to the ratio signal when the first power level exceeds the predetermined threshold, with the predetermined threshold being the absolute level of allowable interference of the spread spectrum communications. The spread spectrum communications also includes means for informing mobile spectrum units whether:

(1) additional users can be added to a cell;
(2) whether each user must be powered down and by how much; and
(3) which users must be powered off, if necessary.

The first measuring means may be embodied as a first receiver having a first bandpass filter 45 and a first detector 47. The first bandpass filter 45 has a first bandwidth, and the first bandwidth overlaps the radio-relay bandwidth. The first receiver measures a first power level within the radio-relay bandwidth of the radio-relay system, i.e. the first power level is an in-band voltage, which is proportional to the received, desired microwave signal level. The first bandwidth, by way of example, may be 100 kHz, 1 MHz, or 10 MHz.

The second measuring means may be embodied as a second receiver having a second bandpass filter 46 and a second detector 48. The second bandpass filter 47 has a second bandwidth. The second bandwidth is located near in frequency and not overlapping the radio-relay bandwidth. The second bandwidth, by way of example, may be 100 kHz, 1 MHz, or 10 MHz. The second receiver measures a second power level outside the radio-relay bandwidth of the radio-relay system, i.e. the second power level is an out-of-band voltage, which is proportional to the spread spectrum interference level.

The present invention further includes coupling means as well as an antenna 41 and amplifier 42 located at the relay station, coupled, through power splitter 44, to the first bandpass filter 45 and to the second bandpass filter 46, for receiving the signal at a relay station, as shown in FIG. 4. The coupling means may be embodied as a diplexer 43 for coupling the signal received at the relay station by the antenna 41 to bandpass filters 45, 46 respectively.

Alternatively, the coupling means may be a collocated antenna located near antenna 41, or any other device for coupling or receiving the signal received by the radio-relay system.

The present invention may include a multiplexer 49 coupled to first bandpass filter 45 and to second bandpass filter 46 for multiplexing the detected first power level and the detected second power level. In a preferred embodiment, the multiplexer 49 is coupled to first and second bandpass filters 45, 46 through first and second detectors 47, 48, respectively.

An analog-to-digital converter 50 may be employed for digitizing the detected first power level and the detected second power level. A preferred embodiment, as shown in FIG. 4, has the analog-to-digital converter 50 coupled to multiplexer 49.

Another embodiment is shown in FIG. 5, with a first analog-to-digital converter 55 and second analog-to-digital converter 56 for digitizing, respectively, the detected first and second power levels from first detector 47 and second detector 48, respectively.

The comparing means and the generating means may be embodied in a processor 51 for comparing the first power level to the predetermined threshold and for generating the ratio signal from the first power level and the second power level. In a preferred embodiment, the ratio signal represents the ratio of the first power level to the second power level, i.e. the ratio signal represents the ratio of the in-band voltage divided by the out-of-band voltage, i.e. the input signal-to-interference (C/I) ratio. The ratio signal is transmitted, preferably over a dedicated line, to the spread-spectrum-base station(s).

Additionally, as shown in FIGS. 6 and 7, each spread-spectrum-base station 80, 82, 84 includes regulating means, respectively, located at each spread-spectrum-base station for regulating a power level transmitted from a corresponding spread-spectrum-base station located within the geographical region. In a preferred embodiment, as illustrated in FIG. 6, the regulating means of each spread-spectrum-base station, 80, 82, 84, respectively, is embodied as variable gain devices 60, 62, 64, respectively, which respond to the ratio signal from the processor 51 by adjusting a power level transmitted from the spread-spectrum-base station 60, 62, 64, respectively.

In another embodiment of the present invention, the regulating means of each spread-spectrum-base station 80, 82, 84 is embodied as a controller 70, 72, 74, respectively, as illustrated in FIG. 7. Each of controllers 70, 72, 74 responds to the ratio signal for sending a message signal to a plurality of spread-spectrum users communicating with each respective spread-spectrum-base station 80, 82, 84, respectively, to indicate when the respective one of spread-spectrum-base stations 80, 82, 84 is in a power-down mode.

A method for dynamically allocating power and capacity of spread spectrum communications is also provided. The method employs at least one spread-spectrum-base station, with the spread spectrum communications overlaying in frequency and in a same geographical area as the radio-relay system. The radio-relay system has at least one relay station within the geographical area. The radio-relay system having a signal with a radio-relay bandwidth. In the preferred embodiment, the method of the present invention comprises the steps of:

a) coupling the signal received at the relay station to the radio-relay system;

b) measuring a first power level, i.e. the signal level, within the radio-relay bandwidth of said radio-relay system;

c) measuring a second power level, i.e. the interference level, outside the radio-relay bandwidth of said radio-relay system;

d) comparing the first power level to the predetermined threshold to form the C/I ratio;

e) generating a ratio signal from the first power level and the second power level; and f) relaying the first power level, the second power level, and/or the ratio signal to the appropriate spread-spectrum-base station(s).

The coupling step (a) may include using a diplexer 43, such as shown in FIG. 4. The step of measuring the first power level includes using a first receiver having a first bandpass filter 45 with a first bandwidth overlapping the radio-relay bandwidth. The step of measuring the first power level also includes the step of detecting, using detector 47, the first power level within the radio-relay bandwidth, i.e. the first power level is the in-band voltage. Similarly, the step of measuring the second power level includes using a second receiver having a second bandpass filter 46 with a second bandwidth not overlapping the radio-relay bandwidth. The step of measuring the second power level also includes the step of detecting, using detector 46, the second power level outside the radio-relay bandwidth, i.e. the second power level is the out-of-band voltage, i.e. the interference.

The step of comparing the first power level to the predetermined threshold, and the step of generating a ratio signal from the first power level and the second power level may be performed by processor 51, as shown in FIGS. 4 and 5. The ratio signal represents the ratio of the first power level to the second power level, i.e. the ratio signal represents the ratio of the in-band voltage divided by the out-of-band voltage.

Furthermore, in the preferred embodiment, the step of regulating the power level transmitted from at least one spread-spectrum-base station may include the step of adjusting the power level transmitted from at least one spread-spectrum-base station, using variable gain devices 60, 62, 64 by spread-spectrum-base stations 80, 82, 84, respectively, as shown in FIG. 6. In addition, in the preferred embodiment, the step of relaying the information includes the step of sending a message signal, using controllers 70, 72, 74 of spread-spectrum-base stations 80, 82, 84 of FIG. 7, respectively, to a plurality of spread-spectrum users, for indicating when the system for spread-spectrum communication is in a power-down mode, and/or for indicating whether additional users can enter the cell.

The method includes the steps of multiplexing, using multiplexer 49, the detected first power level and the detected second power level, and then digitizing, using analog-to-digital converter 50, the detected first power level and the detected second power level, as shown in FIG. 4. In an alternate embodiment, the method includes the step of digitizing, using a first analog-to-digital converter 55, the detected first power level, and the step of digitizing, using a second analog-to-digital converter 56, the detected second power level, as shown in FIG. 5.

Each spread-spectrum-base station 80, 82, 84 of FIGS. 6 and 7 includes regulating means responsive to the ratio signal, and may also include the base-converting means, base-product-processing means, base-transmitting means, base-detection means and a base antenna. The base-detection means may include base-spread-spectrum-processing means and base-synchronizing means. The base-detection means broadly is a repeater which converts spread spectrum coded data communicated from one spread-spectrum unit into a form for output to another spread-spectrum user or telecommunications user.

Each of the spread-spectrum-base stations may be geographically spaced such that the power radiated by the base-transmitting means from within its cell up to a contiguous cell of a neighboring spread-spectrum-base station primarily varies inversely with distance by an exponent of approximately two to four. Also, the area of cells using this spacing requirement are small, on the order of 1200 feet to 2000 feet. The small spacing allows the use of low transmitter power, so as not to cause interference, since the radio-relay microwave user is often spatially and geographically distant from the spread spectrum communications, and the user's distance results in negligible interference with the radio-relay microwave user. When overlaying a cellular telephone system, the spread-spectrum-base stations may be collocated with the cellular telephone base stations.

The base-spread-spectrum-processing means, as illustrated in FIG. 8, may be embodied as a pseudorandom generator, a plurality of product devices 141 and a plurality of bandpass filters 143. The pseudorandom generator stores chip codewords, $g_1(t)$, $g_2(t)$, ... $g_N(t)$, for demodulating data from spread spectrum signals received from the plurality of spread-spectrum units at the spread-spectrum-base station. The base-detection means also includes means for synchronizing the base-spread-spectrum-processing means to received spread spectrum signals.

The base-spread-spectrum-processing means equivalently may include a matched filter, having an impulse response matched to a selected chip codeword. The matched filter may employ digital technology, such as shift registers, and may operate at baseband frequencies, or the matched filter may employ surface acoustic wave devices and may operate at radio frequencies. Preferably, a matched filter is programmable so that the impulse response of the matched filter can be changed to a selected chip codeword.

The base-spread-spectrum-processing means at the spread-spectrum-base station processes selected data received from a selected spread-spectrum unit, which were transmitted with a spread spectrum signal using a selected-chip codeword, $g_i(t)$. The detector 145 demodulates the selected data from the despread spread-spectrum signal.

The spread-spectrum-base station may, on a generic channel, send information regarding the status of the cell, such as whether a new user can be added to the spread-spectrum-base station, and may assign a chip-codeword to the new user. The spread-spectrum-base station can also use the generic spread-spectrum channel to disconnect a rogue user, e.g. a user which, for some reason, is malfunctioning. The generic channel is defined herein to be a spread-spectrum channel which has a common chip codeword which is used by all users. The concept of a generic channel using a generic chip codeword is taught in U.S. patent application having Ser. No. 07/626,109, filing date of Dec. 14, 1990, entitled SYNCHRONOUS SPREAD-SPECTRUM COMMUNICATIONS SYSTEM AND METHOD and incorporated herein by reference.

The plurality of product devices 141, bandpass filters 143 and detectors 145 may be coupled through a power splitter 147 to an antenna 149, for receiving simultaneously multiple spread-spectrum channels. Each product device 141 would use a selected chip codeword for demodulating a selected spread spectrum signal, respectively.

For spread spectrum communications to operate properly, the spread spectrum receiver must acquire the correct phase position of the received spread spectrum signal, and the receiver must continually track that phase position so that loss-of-lock will not occur. The two processes of acquisition and tracking form the synchronization subsystem of a spread spectrum receiver. The former operation is typically accomplished by a search of as many phase positions as necessary until one is found which results in a large correlation between the phase of the incoming signal and the phase of the locally generated spreading sequence at the receiver. This former process occurs using a correlator or a matched filter. The latter operation is often performed with a "delay-lock loop". The importance of the combined synchronization process cannot be overstated; for, if synchronization is not both achieved and maintained, the desired signal cannot be despread.

The base-converting means, as illustrated in FIG. 9, may be embodied as a plurality of base modulators 151. A base modulator 151 converts the format of data to be transmitted to a spread-spectrum user into a form for output to communicate over radio waves. For example, an analog voice signal may be converted to a base-data signal, using a technique called source encoding. Typical source coders are linear predictive coders, vocoders, delta modulators and pulse code modulation coders.

The base-product-processing means may be embodied as a plurality of base-spread-spectrum modulators 153. A base-spread-spectrum modulator 153 is coupled to a base modulator 151. The base-spread-spectrum modulator 153 modulates the converted-data signal using spread spectrum. The converted data is multiplied using a product device 153 with a selected spread-spectrum chip codeword, $g_{N+i}(t)$. The spread-spectrum bandwidth of the converted data is much greater than, at least four times, the narrowband bandwidth of a fixed service microwave user. The spread-spectrum bandwidth typically overlays in spectrum one or more radio-relay channels. In a preferred embodiment, the spread-spectrum bandwidth is 48 MHz.

The base-transmitting means may be embodied as plurality of base transmitters 155. A base transmitter 155 is coupled to a base-spread-spectrum-processed-converted data from the spread-spectrum-base station to a spread-spectrum unit. The base transmitter 155 includes modulating the spread-spectrum-processed converted data at a carrier frequency, $f_o$.

The base-transmitter 155 has a transmitter oscillator which supplies a carrier signal at the carrier frequency. The transmitter oscillator is coupled to a transmitter product device. The transmitter multiplies, using the transmitter-product device, the spread-spectrum-processed-converted data by the carrier signal.

The base-transmitting means may, in a preferred embodiment, transmit data using a spread spectrum signal having a power level limited to a predetermined level. The base-transmitting means may transmit data by adding the plurality of spread spectrum data signals.

A plurality of modulators 151, product devices 153 and transmitters 155 may be coupled through a power combiner 157 to an antenna 159 for simultaneously transmitting a multiplicity of spread-spectrum channels. FIG. 9 is an illustrative embodiment for generating simultaneous spread spectrum signals, and there are many variants for interconnecting product devices, modulators and transmitters, for accomplishing the same function.

As an alternative example, FIG. 10 illustrates a spread-spectrum-base station transmitter which may be used for producing the same result as the transmitter of FIG. 9. In FIG. 10, data are modulo-2 added, using EXCLUSIVE-OR gates 253 with a selected spread-spectrum chip codeword, $g_{N+i}(t)$. The resulting spread-spectrum-processed data from a plurality of EXCLUSIVE-OR gates 253 are combined using combiner 257. The base transmitter 255 modulates the combined the combined spread-spectrum-processed data at the carrier frequency, $f_o$. The transmitter 255 is coupled to the antenna 159 and simultaneously transmits the plurality of spread-spectrum-processed data on a multiplicity of spread-spectrum channels.

A spread-spectrum-base station transmitter also may use a matched filter, with an impulse response matched to a selected chip codeword, $g_i(t)$. The matched filter may employ digital technology, such as shift registers, and may operate at baseband frequencies, or the matched filter may employ surface acoustic wave devices and may operate at radio frequencies. Preferably, a matched filter is programmable so that the impulse response of the matched filter can be changed to a selected chip codeword.

The system for spread spectrum communications also includes spread-spectrum units which are located within the cell. Each of the spread-spectrum units may have a spread-spectrum antenna, spread-spectrum-detection means, spread-spectrum-converting means, spread-spectrum-product-processing means and spread-spectrum-transmitting means. The spread-spectrum-detection means is coupled to the spread-spectrum-antenna. The spread-spectrum-detection means includes spread-spectrum-processing means.

The spread-spectrum-detection means recovers data communicated to the spread-spectrum unit from the spread-spectrum-base station. The detection means also includes means for converting the format of the data into a form for output to a user. The format may be, for example, computer data, an analog speech signal, or other information. The spread-spectrum-detection means, by way of example, may include tracking and acquisition circuits for the spread spectrum signal and an envelope detector. FIG. 11 illustratively shows an antenna 169 coupled to spread-spectrum-detection means, which is embodied as a spread-spectrum demodulator 161, spread-spectrum-bandpass filter 163, and spread-spectrum-data detector 165.

The spread-spectrum demodulator 161 despreads, using a chip-code signal having the same or selected chip codeword, $g_{N+i}(t)$, as the received spread-spectrum signal, the spread-spectrum signal received from the spread-spectrum-base station. The bandpass filter 163 filters the despread signal and the spread-spectrum-data detector 165 puts the format of the despread spectrum-spectrum signal into a form for output to a spread-spectrum user.

The spread-spectrum-processing means includes means for storing local chip codeword, $g_{N+i}(t)$, for comparing to signals received for recovering data sent from the spread-spectrum-base station to the spread-spectrum unit.

Alternately, the spread-spectrum-processing means may be embodied as a matched filter, having an impulse response matched to a selected chip codeword. The matched filter may employ digital technology, such as shift registers, and may operate at baseband frequencies, or the matched filter may employ surface acoustic wave devices and may operate at radio frequencies. Preferably, a matched filter is programmable so that the impulse response of the matched filter can be changed to a selected chip codeword.

The spread-spectrum-processing means also may include means for synchronizing the spread-spectrum-processing means to received signals. Similarly, the spread-spectrum-processing means at the spread-spectrum-base station includes means for processing data for particular spread-spectrum units with a selected chip codeword.

The spread-spectrum-converting means, as illustrated in FIG. 12, may be embodied as a spread-spectrum modulator 171. The spread-spectrum modulator 171 converts the format of the data into a form for output for communicating over radio waves. Similar to the spread-spectrum-base station, an analog voice signal may be converted to a converted-data signal, using a technique called source encoding. As with the base modulator 151, typical source encoders are linear predictive coders, vocoders, adaptive delta modulators and pulse code modulators.

The spread-spectrum-product-processing means may be embodied as a spread-spectrum modulator 173. The spread-spectrum modulator 173 is coupled to the spread-spectrum modulator 171. The spread-spectrum modulator 173 modulates the converted-data signal with a selected chip codeword, $g_i(t)$. The converted-data signal is multiplied using product device 173 with the selected chip codeword, $g_i(t)$ The spread-spectrum bandwidth of the converted data is much greater than, at least four times greater in the preferred embodiment, the narrowband bandwidth of a fixed service microwave user. In a preferred embodiment, the spread-spectrum bandwidth is 48 MHz. The spread-spectrum bandwidth from the spread-spectrum modulator 171 is the same as that of the modulator 151 at the spread-spectrum-base station, and may overlay, or partially overlay, the same microwave frequency or overlay separate microwave frequencies.

As an equivalent transmitter, FIG. 13 illustrates a transmitter for a spread-spectrum unit having spread-spectrum-processing means as a spread-spectrum modulo-2 adder, embodied as an EXCLUSIVE-OR gate 273. The EXCLUSIVE-OR gate 273 modulo-2 adds the converted data signal with the selected chip codeword, $g_i(t)$.

The spread-spectrum-transmitting means in FIGS. 9 and 10 may be embodied as a spread-spectrum transmitter 175. The spread-spectrum transmitter 175 is coupled between the spread-spectrum modulator 173 and antenna 179. The spread-spectrum-transmitter 175 transmits, across the radio-relay microwave bandwidth, the spread-spectrum-processed-converted data from the spread-spectrum unit to the spread-spectrum-base station. The spread-spectrum transmitter 175 modulates the spread-spectrum-processed-converted data at a carrier frequency, $f_o$. The carrier frequency of the spread-spectrum transmitter and the cell transmitter may be at the same or at different frequencies. Typically the spread-spectrum transmitter and the cell transmitter use the same frequency if half duplex is used, and two frequencies may be used if full duplex is used.

The spread spectrum signals for the spread spectrum communications in the present invention are designed to be "transparent" to other users, i.e., spread spectrum signals are designed to provide "negligible" interference to the communication of other, existing users. The presence of a spread spectrum signal is difficult to determine.

This characteristic is known as low probability of interception (LPI) and low probability of detection (LPD). The LPI and LPD features of spread spectrum allow transmission between users of a spread spectrum CDMA communications system without the existing users of the mobile cellular system experiencing significant interference. The spread spectrum communications may make use of LPI and LPD with respect to the predetermined channels in the radio-relay microwave system. By having the power level of each spread spectrum signal below the predetermined level, the total power from all spread spectrum users within a cell does not interfere with users in the radio-relay system.

Spread spectrum is also "jam" or interference resistant. A spread spectrum receiver spreads the spectrum of the interfering signal. This reduces the interference from the interfering signal so that it does not noticeably degrade performance of the spread spectrum communications. This feature of interference reduction makes spread spectrum useful for commercial communications, i.e. the spread spectrum waveforms can be overlaid on top of existing narrowband signals.

The spread spectrum communications of the present invention may employ direct sequence spread spectrum, which uses a phase, or amplitude, modulation technique. Direct sequence spread spectrum takes the power that is to be transmitted and spreads it over a very wide bandwidth so that the power per unit bandwidth (watts/hertz) is minimized. When this is accomplished, the transmitted spread spectrum power received by a microwave user, having a relatively narrow bandwidth, is only a small fraction of the actual transmitted power.

In a radio-relay microwave system, by way of example, if a spread spectrum signal having a power of 10 milliwatts is spread over a radio-relay microwave bandwidth of 48 MHz and a microwave user employs a communication system having a channel bandwidth of only 10 MHz, then the effective interfering power due to one spread spectrum signal, in the narrow band communication system, is reduced by the factor of 48 MHz/10 MHz, which is approximately 5. Thus, the effective interfering power is 10 milliwatts (mW) divided by 5 or 2.0 mW. For fifty concurrent users of spread spectrum, the power of the interfering signal due to spread spectrum is increased by fifty to a peak interfering power of 100 mW.

The feature of spread spectrum that results in interference reduction is that the spread spectrum receiver actually spreads the received energy of any interferer over the same wide bandwidth, 48 MHz in the present example, while compressing the bandwidth of the desired received signal to its original bandwidth. For example, if the original bandwidth of the desired spread-spectrum-data signal is only 30 kHz, then the power of the interfering signal produced by the cellular spread-spectrum-base station is reduced by 48 MHz/30 kHz which is approximately 1600.

Direct sequence spread spectrum achieves a spreading of the spectrum by modulating the original signal with a very wideband signal relative to the data bandwidth. This wideband signal is chosen to have two possible amplitudes, +1 and −1, and these amplitudes are switched, in a "pseudo-random" manner, periodically, Thus, at each equally spaced time interval, a decision is made as to whether the wideband modulating signal should be +1 or −1. If a coin were tossed to make such a decision, the resulting sequence would be truly random. However, in such a case, the receiver would not know the sequence a priori and could not properly receive the transmission. Instead a chip-code generator generates electronically an approximately random sequence, called a pseudo-random sequence, which is known a priori to the transmitter and receiver.

To illustrate the characteristics of spread spectrum, consider 4800 bps data which are binary-phase-shift keyed (BPSK) modulated. The resulting signal bandwidth is approximately 9.6 kHz. This bandwidth is then spread using direct sequence spread spectrum to 16 MHz. Thus, the processing gain, N, is approximately 1600 or 32 dB.

Alternatively, consider a more typical implementation with 4800 bps data which is modulo-2 added to a spread-spectrum-chip-code signal, $g_i(t)$, having a chip rate of 25 Mchips/sec. The resulting spread-spectrum data are binary-phase-shift keyed (BPSK) modulated. The resulting spread-spectrum bandwidth is 48 MHz. Thus, the processing gain is: $N'=(25\times 10^6)/(4.8\times 10^3)$, which approximately equals 5000, or 37 dB.

FIG. 14 shows the spectrum of this spread spectrum signal of an amplitude modulated 3 kHz sinusoidal signal, when they each have the same power level. The bandwidth of the AM waveform is 6 kHz. Both waveforms have the same carrier frequency. FIG. 15 shows the demodulated square-wave data stream. This waveform has been processed by an "integrator" in the receiver, hence the triangular shaped waveform, with positive and negative peak voltages representing a 1-bit and 0-bit are clearly shown. FIG. 16 shows that the demodulated AM signal replicates the 3 kHz sine wave.

The AM signal does not degrade the reception of data because the spread spectrum receiver spreads the energy of the AM signal over 16 MHz, while compressing the spread spectrum signal back to its original 9.6 kHz bandwidth. The amount of the spread AM energy in the 9.6 kHz BPSK bandwidth is the original energy divided by N=1600 (or, equivalently, it is reduced by 32 dB). Since both waveforms initially were of equal power, the signal-to-noise ratio is now 32 dB, which is sufficient to obtain a very low error rate.

The spread spectrum signal does not interfere with the AM waveform because the spread spectrum power in the bandwidth of the AM signal is the original power in the spread spectrum signal divided by $N_1$, where $$N_1 = \frac{16 \text{ MHz}}{6 \text{ kHz}} = 2670$$

or 30 dB. Hence the signal-to-interference ratio of the demodulated sine wave is 33 dB.

Figure 17:
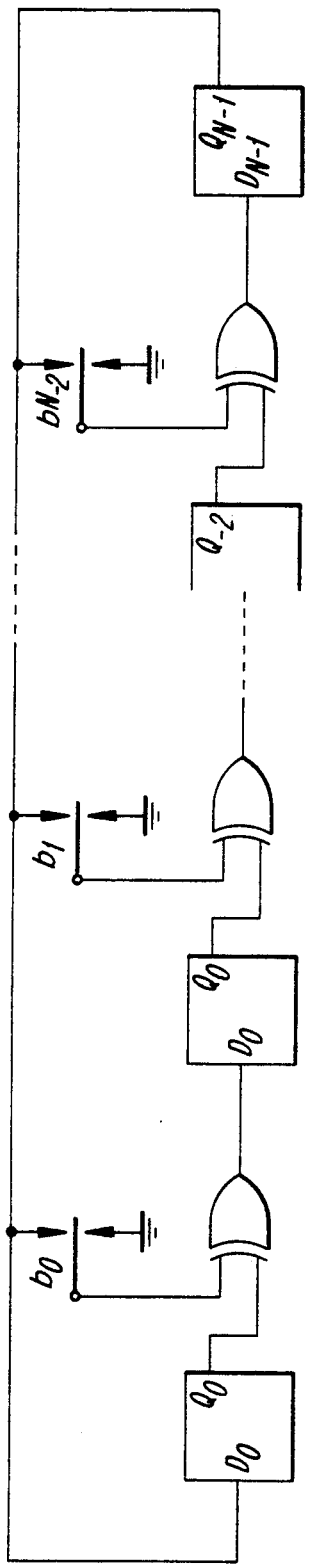
FIG. 17 shows a possible pseudo-random sequence generator.

The direct sequence modes of spread spectrum use pseudo-random sequences to generate the spreading sequence. While there are many different possible sequences, the most commonly used are "maximal-length" linear shift register sequences, often referred to as pseudo-noise (PN) sequences. FIG. 17 shows a typical shift register sequence generator. FIG. 18 indicates the position of each switch $b_i$ to form a PN sequence of length L, where $L=2^N-1$. The characteristics of these sequences are indeed "noise like". To see this, if the spreading sequence is properly designed, it will have many of the randomness properties of a fair coin toss experiment where "1"=heads and "−1"=tails. These properties include the following:

1) In a long sequence, about ½ of the chips will be +1 and ½ will be −1.
2) The length of a run of r chips of the same sign will occur about $L/2^r$ times in a sequence of L chips.
3) The autocorrelation of the sequence $P_i(t)$ and $PN_i(t+\tau)$ is very small except in the vicinity of $\tau=0$.
4) The cross-correlation of any two sequences $PN_i(t)$ and $PN_j(t+\tau)$ is small.

CODE DIVISION MULTIPLE ACCESS

Code division multiple access (CDMA) is direct sequence spread spectrum communications in which a number, at least two, of spread-spectrum signals communicate simultaneously, each operating over the same frequency band. In a CDMA system, each user is given a distinct chip codeword. This chip codeword identifies the user. For example, if a first user has a first chip codeword, $g_1(t)$, and a second user a second chip codeword, $g_2(t)$, etc., then a receiver, desiring to listen to the first user, receives at its antenna all of the energy sent by all of the users. However, after despreading the first user's signal, the receiver outputs all the energy of the first user but only a small fraction of the energies sent by the second, third, etc., users.

CDMA is interference limited. That is, the number of users that can use the same spectrum and still have acceptable performance is determined by the total interference power that all of the users, taken as a whole, generate in the receiver. Unless one takes great care in power control, those CDMA transmitters which are close to the receiver will cause overwhelming interference. This effect is known as the "near-far" problem. In a mobile environment the near-far problem could be the dominant effect. Controlling the power of each individual mobile user is possible so that the received power from each mobile user is the same. This technique is called "adaptive power control". See U.S. Pat. No. 5,093,840, entitled, ADAPTIVE POWER CONTROL FOR A SPREAD SPECTRUM TRANSMITTER, by Donald L. Schilling, which is incorporated herein by reference.

Spread spectrum CDMA can significantly increase the use of spectrum. With CDMA, each user in a cell uses the same frequency band. However, each spread-spectrum CDMA signal has a separate pseudo random code which enables a receiver to distinguish a desired signal from the remaining signals. Spread-spectrum users in adjacent cells use the same frequency band and the same bandwidth, and therefore "interfere" with one another. A received signal may appear somewhat noisier as the number of users' signals received by a spread-spectrum-base station increases.

Each unwanted user's signal generates some interfering power whose magnitude depends on the processing gain. Spread-spectrum users in adjacent cells increase the expected interfering energy compared to spread-spectrum users within a particular cell by about 50%, assuming that the spread-spectrum users are uniformly distributed throughout the adjacent cells. Since the interference increase factor is not severe, frequency reuse is not employed. Each spread spectrum cell can use a full 48 MHz band for transmission and a full 48 MHz band for reception. Hence, using a chip rate of twenty five million chips per second and a coding data rate of 32 kbps results in approximately a processing gain of 750 chips per bit. It is well known to those skilled in the art that the number of spread-spectrum CDMA users is approximately equal to the processing gain. Thus, up to 750 users can operate in the 48 MHz bandwidth overlaying one or more fixed service microwave systems in the 1.85-1.99 GHz region.

SHARED SPECTRUM CAPABILITY OF CDMA SPREAD SPECTRUM

An interesting aspect of the use of DS CDMA for cellular radio transmission is in the possibility of overlaying the DS CDMA spread-spectrum radio network on top of existing users occupying the frequency band of interest. That is, it is not necessary to supply to the spread spectrum users a frequency band which is completely devoid of other users. Rather, if the frequency band is partially occupied by various narrowband users, it is often possible to superimpose the DS CDMA signals on the same band in such a manner that both sets of users can co-exist.

Figure 19:
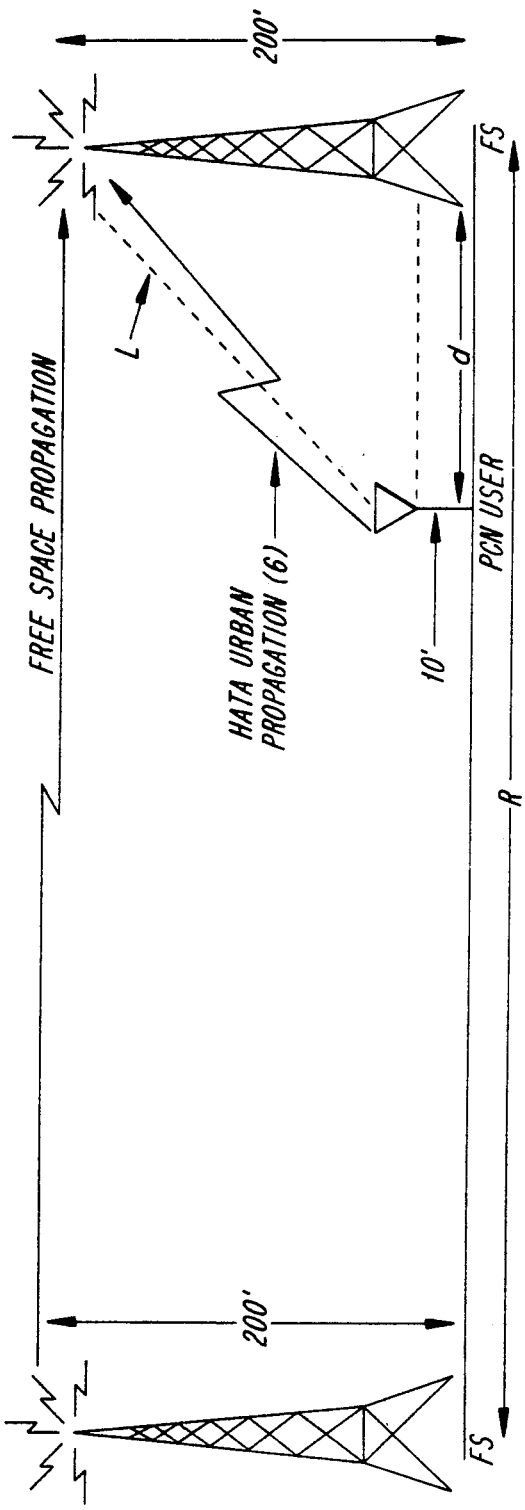
FIG. 19 illustrates a geographic architecture for spread spectrum communications according to the present invention.

A geographic architecture for spread spectrum communications is shown in FIG. 19. A multiplicity of microcells, each having a spread-spectrum-base station, communicate with a plurality of spread-spectrum users.

To see that CDMA spread-spectrum can coexist with fixed service (FS) microwave users, the effect of the mobile spread-spectrum users on the FS microwave receiver and the effect of the FS microwave transmitter on a mobile spread-spectrum user must be examined.

EFFECT OF SPREAD-SPECTRUM USERS ON A FS MICROWAVE RECEIVER

To examine the effect of the mobile spread-spectrum user on a FS microwave receiver, refer to FIG. 3. A spread-spectrum user is shown whose transmission is received by a microwave receiver. The spread-spectrum user's signal is attenuated by (1) path loss and (2) antenna directivity which results in a significant decrease in the FS microwave antenna gain, in the direction of the spread-spectrum user.

The free space propagation loss, $L_{uW}$, between FS transmitter and receiver is:

$$L_{uW} = 103 + 20 \, log(R), \, dB \tag{1}$$

while the path loss $L_{SS}$ between a spread-spectrum user and FS receiver typically is not the free space path loss as it is affected by multipath. A standard representation, approved by the CCIR is:

$$L_{SS} = 135.5 + 33.21 \, log(d), \, dB \tag{2}$$

In these equations R is the distance, in miles, between the transmitter and the receiver and d is the distance, in miles, between the system for spread spectrum communications and the receiver.

Using equations (1) and (2), the ratio of the received power $P_s$ from the FS microwave transmitter to the received interference $P_I$ of the spread-spectrum user(s) can be determined. Note that, if $P_s/P_I = 23$ dB, the probability of a symbol being in error before FEC decoding is $10^{-3}$. The coding gain of a typical FS microwave receiver is 3 dB.

Assuming that there are 100 active spread-spectrum users/cell, uniformly distributed across the cell, and there are 32 (or more) cells facing the FS microwave receiver, then the resulting $P_s/P_I = 53$ dB, which provides a signal-to-noise ratio of 23 dB with a 30 dB fade margin. This corresponds to an undecoded error rate of $10^{-3}$.

DYNAMIC ALLOCATION OF THE SPREAD SPECTRUM COMMUNICATIONS

The present invention provides a system and method for dynamically allocating capacity and power of spread spectrum communications overlaying, geographically and in frequency, a radio-relay system. The capacity and power of the spread spectrum communications are allocated so as to prevent interference to the radio-relay system. In use, the present invention provides a monitoring system which measures, using a first radio receiver, a first power level within the radio-relay bandwidth of the radio-relay system. The first receiver is located near the relay receiver of the radio-relay system, and has a first bandpass filter.

The system also measures, using a second receiver, a second power level outside the radio-relay bandwidth of the radio-relay system. The second receiver is located near the relay receiver of the radio-relay system, and has a bandpass filter.

The first power level is compared to the predetermined threshold, and, in addition, a ratio signal is generated from the first power level and the second power level. The ratio signal represents the ratio of the first power level to the second power level, and the ratio signal is transmitted over a dedicated line to the spread-spectrum-base stations. Using the ratio signal, when the first power level exceeds the predetermined threshold, a power level transmitted from each spread-spectrum-base station located within the geographical region is regulated and the capacity of the spread spectrum communications is dynamically allocated.

The dynamic capacity allocation is performed with the monitoring system placed at a representative sample of, or all, radio-relay receiver sites. The monitoring system is connected, preferably using a dedicated telephone line, to an appropriate spread-spectrum-base station(s). If the monitoring system detects an excess of interference, then the monitoring station immediately or continuously notifies the spread-spectrum-base station. In response to this notification, the spread-spectrum-base station does not accept and/or reduces the number of spread-spectrum users allowed to access the spread-spectrum-base station(s). In this manner, the capacity of the spread-spectrum-base station(s) is dynamically controlled by the tolerable signal-to-noise ratio or bit error rate of the radio-relay system. By using these techniques, users of the spread spectrum communications are not envisaged as being cut off.

It will be apparent to those skilled in the art that various modifications can be made to the dynamic capacity allocation spread-spectrum communications of the instant invention without departing from the scope or spirit of the invention, and it is intended that the present invention cover modifications and variations of the dynamic capacity allocation spread spectrum communications provided they come within the scope of the appended claims and their equivalents.

I claim:

1. A method for dynamically allocating power and capacity of a spread spectrum system having at least one spread-spectrum-base station, with said spread spectrum system overlaying, at least in part, in frequency and in a same geographical area as a radio-relay system, said radio-relay system having at least one relay station within the geographical area, said radio-relay system having a signal with a radio-relay bandwidth, comprising the steps of:

coupling, with a diplexer, the signal received at said relay station to said radio-relay system;

measuring, at said radio-relay system, with a first receiver having a bandpass filter and with the first bandwidth overlapping the radio-relay bandwidth, a first power level within the radio-relay bandwidth of said radio-relay system;

measuring, at said radio-relay system, with a second receiver having a bandpass filter with the second bandwidth not overlapping the radio-relay bandwidth, a second power level outside the radio-relay bandwidth of said radio-relay system;

comparing the first power level to a predetermined threshold;

generating a ratio signal from the first power level and the second power level;

regulating, when the first power level exceeds the predetermined threshold, a power level transmitted from the at least one spread-spectrum-base station located within the geographical region in response to the ratio signal; and regulating, when the first power level exceeds the predetermined threshold, a number of user units accessing the at least one spread-spectrum-base station.

2. The method as set forth in claim 1 wherein:

the step of measuring the first power level includes the step of detecting the first power level within the radio-relay bandwidth; and the step of measuring the second power level includes the step of detecting the second power level outside the radio-relay bandwidth.

3. The method as set forth in claim 1 wherein the step of regulating the power level transmitted from the at least one spread-spectrum-base station includes the step of adjusting the power level transmitted from the at least one spread-spectrum-base station.

4. The method as set forth in claim 1 wherein the step of regulating a number of user units includes the step of sending a message signal to a plurality of spread-spectrum users, for indicating when the at least one spread-spectrum-base station is in a power-down mode.

5. The method as set forth in claim 2, further comprising the steps of:

multiplexing the detected first power level and the detected second power level; and digitizing, using an analog-to-digital converter, the detected first power level and the detected second power level.

6. The method as set forth in claim 2, further comprising the steps of:

digitizing, using a first analog-to-digital converter, the detected first power level; and digitizing, using a second analog-to-digital converter, the detected second power level.

7. A method for dynamically allocating power and capacity of a spread spectrum system having at least one spread-spectrum-base station, with said spread-spectrum system overlaying, at least in part, in frequency and in a same geographical area as a radio-relay system, said radio-relay system having a signal with a radio-relay bandwidth, comprising the steps of:

measuring a first power level within the radio-relay bandwidth of said radio-relay system;

measuring a second power level outside the bandwidth of said radio-relay system;

comparing the first power level to a predetermined threshold;

generating a ratio signal from the first power level and the second power level; and regulating, when the first power level exceeds the predetermined threshold, a power level transmitted from the at least one spread-spectrum-base station in response to the ratio signal.

8. The method as set forth in claim 7 wherein:

the step of measuring the first power level includes the step of detecting the first power level within the radio-relay bandwidth; and the step of measuring the second power level includes the step of detecting the second power level outside the radio-relay bandwidth.

9. The method as set forth in claim 7 wherein the step of regulating the power level transmitted from the at least one spread-spectrum-base station includes the step of adjusting the power level transmitted from the at least one spread-spectrum-base station.

10. The method as set forth in claim 8, further comprising the steps of:

multiplexing the detected first power level and the detected second power level; and digitizing, using an analog-to-digital converter, the detected first power level and the detected second power level.

11. The method as set forth in claim 8, further comprising the steps of:
digitizing, using a first analog-to-digital converter, the detected first power level; and
digitizing, using a second analog-to-digital converter, the detected second power level.

12. A method for dynamically allocating power and capacity of a spread spectrum system having at least one spread-spectrum-base station, with said spread-spectrum system overlaying, at least in part, in frequency and in a same geographical area as a radio-relay system, said radio-relay system having a signal with a radio-relay bandwidth, comprising the steps of:
measuring a first power level within the radio-relay bandwidth of said radio-relay system;
measuring a second power level outside the bandwidth of said radio-relay system;
comparing the first power level to a predetermined threshold;
generating a ratio signal from the first power level and the second power level; and
regulating, when the first power level exceeds the predetermined threshold, a number of user units accessing the at least one spread-spectrum-base station.

13. The method as set forth in claim 12 wherein:
the step of measuring the first power level includes the step of detecting the first power level within the radio-relay bandwidth; and
the step of measuring the second power level includes the step of detecting the second power level outside the radio-relay bandwidth.

14. The method as set forth in claim 12 wherein the step of regulating a number of user units includes the step of sending a message signal to a plurality of spread-spectrum users, for indicating when the at least one spread-spectrum-base station is in a power-down mode.

15. The method as set forth in claim 13, further comprising the steps of:
multiplexing the detected first power level and the detected second power level; and
digitizing, using an analog-to-digital converter, the detected first power level and the detected second power level.

16. The method as set forth in claim 12, further comprising the steps of:
digitizing, using a first analog-to-digital converter, the detected first power level; and
digitizing, using a second analog-to-digital converter, the detected second power level.

17. A system for dynamically allocating power and capacity of a spread spectrum system having at least one spread-spectrum-base station, with said spread spectrum system overlaying, at least in part, in frequency and in a same geographical area as a radio-relay system, said radio relay system having at least one relay station within the geographical area, said radio-relay system having a signal with a radio-relay bandwidth, comprising:
first means, located near a relay receiver of said radio-relay system, for measuring with a first receiver having a bandwidth approximately equal to the radio-relay bandwidth for transmitting the signal to said radio-relay system, a first power level within the radio-relay bandwidth of said radio-relay system;
second means, located near said relay receiver of said radio-relay system, for measuring with a second receiver having a bandwidth approximately equal the radio-relay bandwidth for transmitting the signal to said radio-relay system, a second power level outside the radio-relay bandwidth of said radio-relay system;
means, located at each relay station, for coupling the signal received at said relay station to at said first measuring means and to said second measuring means;
means for comparing the first power level to a predetermined threshold;
means for generating a ratio signal from the first power level and the second power level; and
first means for regulating, when the first power level exceeds the predetermined threshold, a power level transmitted from the at least one spread-spectrum-base station located within the geographical region in response to the ratio signal; and
second means for regulating, when the first power level exceeds the predetermined threshold, a number of user units accessing the at least one spread-spectrum-base station.

18. The system as set forth in claim 17 wherein said coupling means includes a diplexer for coupling the signal received at said relay station to said first measuring means and to said second measuring means.

19. The system as set forth in claim 18 wherein:
said first measuring means includes a first bandpass filter with a first bandwidth approximately equal to the radio-relay bandwidth and with the first bandwidth overlapping the radio-relay bandwidth; and
said second measuring means includes a second bandpass filter with a second bandwidth approximately equal to the radio-relay bandwidth and with the second bandwidth located near in frequency and not overlapping the radio-relay bandwidth.

20. The system as set forth in claim 19 wherein:
said first measuring means further includes a first detector, coupled to said first bandpass filter, for detecting the first power level within the radio-relay bandwidth; and
said second measuring means further includes a second detector, coupled to said second bandpass filter, for detecting the second power level outside the radio-relay bandwidth.

21. The system as set forth in claim 20, further comprising:
a multiplexer, coupled to the first detector and the second detector, for multiplexing the detected first power level and the detected second power level;
an analog-to-digital converter for digitizing the detected first power level and the detected second power level; and
wherein said comparing means and said generating means are embodied in a processor for comparing the first power level to the predetermined threshold and for generating the ratio signal from the first power level and the second power level.

22. The system as set forth in claim 21 wherein said first regulating means includes a variable gain device, responsive to the ratio signal, for adjusting a power level transmitted from the at least one spread-spectrum-base station.

23. The system as set forth in claim 21 wherein said second regulating means includes a controller, located at the at least one spread-spectrum-base station, the controller responsive to the ratio signal for sending a message signal to a plurality of spread-spectrum users communicating with the at least one spread-spectrum-base station, indicating when the at least one spread-spectrum-base station is in a power-down mode.

24. The system as set forth in claim 20 further comprising:
   a first analog-to-digital converter for digitizing the first power level;
   a second analog-to-digital converter for digitizing the second power level; and
   wherein said comparing means and second generating means are embodied in a processor for comparing the first power level to the predetermined threshold and for generating the ratio signal from the first power level and the second power level.

25. The system as set forth in claim 24 wherein said first regulating means includes a variable gain device, responsive to the ratio signal, for adjusting a power level transmitted from the at least one spread-spectrum-base station.

26. The system as set forth in claim 24 wherein said second regulating means includes a controller, located at the at least one spread-spectrum-base station, the controller responsive to the ratio signal for sending a message signal to a plurality of spread-spectrum users communicating with the at least one spread-spectrum-base station, indicating when the at least one spread-spectrum-base station is in a power-down mode.

27. The system as set forth in claim 18 wherein said first regulating means includes a variable gain device, responsive to the ratio signal, for adjusting a power level transmitted from the at least one spread-spectrum-base station.

28. The system as set forth in claim 18 wherein said second regulating means includes a controller, located at the at least one spread-spectrum-base station, the controller responsive to the ratio signal for sending a message signal to a plurality of spread-spectrum users communicating with the at least one spread-spectrum-base station, indicating when the at least one spread-spectrum-base station is in a power-down mode.

29. A system for dynamically allocating power and capacity of a spread spectrum system having at least one spread-spectrum-base station, with said spread spectrum system overlaying, at least in part, in frequency and in a same geographical area as a radio-relay system, said radio-relay system having a signal with a radio-relay bandwidth, comprising:
   first means for measuring a first power level within the radio-relay bandwidth of said radio-relay system;
   second means for measuring a second power level outside the radio-relay bandwidth of said radio-relay system;
   means for comparing the first power level to a predetermined threshold;
   means for generating a ratio signal from the first power level and the second power level; and
   means for regulating, when the first power level exceeds the predetermined threshold, a power level transmitted from the at least one spread-spectrum-base station in response to the ratio signal.

30. A system for dynamically allocating power and capacity of a spread spectrum system having at least one spread-spectrum-base station, with said spread spectrum system overlaying, at least in part, in frequency and in a same geographical area as a radio-relay system, said radio-relay system having a signal with a radio-relay bandwidth, comprising:
   first means for measuring a first power level within the radio-relay bandwidth of said radio-relay system;
   second means for measuring a second power level outside the radio-relay bandwidth of said radio-relay system;
   means for comparing the first power level to a predetermined threshold;
   means for generating a ratio signal from the first power level and the second power level; and
   means for regulating, when the first power level exceeds the predetermined threshold, a number of user units accessing the at least one spread-spectrum-base station.

* * * * *